(12) United States Patent
Bergholz et al.

(10) Patent No.: US 11,280,215 B2
(45) Date of Patent: Mar. 22, 2022

(54) ENGINE COMPONENT ASSEMBLY (71) Applicant: General Electric Company, Schenectady, NY (US)

(72) Inventors: Robert Frederick Bergholz, Loveland, OH (US); Jason Randolph Allen, Loveland, OH (US); Robert David Briggs, West Chester, OH (US); Kevin Robert Feldmann, Mason, OH (US); Curtis Walton Stover, Mason, OH (US); Zachary Daniel Webster, Mason, OH (US); Fernando Reiter, Reading, OH (US)

(73) Assignee: General Electric Company, Schenectady, NY (US)

( * ) Notice: Subject to any disclaimer, the term of this patent is extended or adjusted under 35 U.S.C. 154(b) by 889 days.

(21) Appl. No.: 15/522,854

(22) PCT Filed: Oct. 28, 2015

(86) PCT No.: PCT/US2015/057708
§ 371 (c)(1),
(2) Date: Apr. 28, 2017

(87) PCT Pub. No.: WO2016/099662
PCT Pub. Date: Jun. 23, 2016

(65) Prior Publication Data
US 2017/0335716 A1 Nov. 23, 2017

Related U.S. Application Data

(60) Provisional application No. 62/073,527, filed on Oct. 31, 2014.

(51) Int. Cl.
*F01D 25/12* (2006.01)
*F23R 3/00* (2006.01)
(Continued)

(52) U.S. Cl.
CPC ............. *F01D 25/12* (2013.01); *F01D 5/187* (2013.01); *F01D 5/188* (2013.01); *F01D 9/041* (2013.01);
(Continued)

(58) Field of Classification Search
CPC ... F05D 2260/22141; F05D 2260/2212; F05D 2260/221
See application file for complete search history.

(56) References Cited

U.S. PATENT DOCUMENTS 4,907,411 A * 3/1990 Krueger ................. F23R 3/007
60/753
6,000,908 A 12/1999 Bunker
(Continued)

FOREIGN PATENT DOCUMENTS

EP 1 284 338 A2 2/2003
EP 2 235 328 A1 10/2010
(Continued)

OTHER PUBLICATIONS

International Search Report and Written Opinion issued in connection with corresponding PCT Application No. PCT/US2015/057708 dated Jun. 17, 2016.
(Continued)

*Primary Examiner* — Gerald L Sung
*Assistant Examiner* — Jacek Lisowski
(74) *Attorney, Agent, or Firm* — McGarry Bair PC (57) ABSTRACT

An engine component assembly includes a first engine component having a hot surface in thermal communication with a hot combustion gas flow and a cooling surface with at least one cavity. A second engine component is spaced from the cooling surface, and includes at least one cooling aperture. The cooling aperture is arranged such that cooling fluid impinges on the cooling surface at an angle.

26 Claims, 11 Drawing Sheets

(51) Int. Cl.
- *F01D 5/18* (2006.01)
- *F23R 3/06* (2006.01)
- *F01D 9/04* (2006.01)
- *F01D 11/08* (2006.01)
- *F02C 3/04* (2006.01)
- *F02C 7/18* (2006.01)
- *F23R 3/04* (2006.01)

(52) U.S. Cl.
CPC .............. *F01D 11/08* (2013.01); *F02C 3/04* (2013.01); *F02C 7/18* (2013.01); *F23R 3/002* (2013.01); *F23R 3/005* (2013.01); *F23R 3/04* (2013.01); *F23R 3/06* (2013.01); *F05D 2220/32* (2013.01); *F05D 2240/127* (2013.01); *F05D 2240/128* (2013.01); *F05D 2240/24* (2013.01); *F05D 2240/35* (2013.01); *F05D 2250/38* (2013.01); *F05D 2250/712* (2013.01); *F05D 2260/201* (2013.01); *F05D 2260/202* (2013.01); *F05D 2260/2212* (2013.01); *F05D 2260/22141* (2013.01); *F05D 2260/607* (2013.01); *F23R 2900/03042* (2013.01); *F23R 2900/03044* (2013.01); *F23R 2900/03045* (2013.01); *Y02T 50/60* (2013.01)

(56) References Cited

U.S. PATENT DOCUMENTS

| | | | |
|---|---|---|---|
| 8,408,872 B2 | 4/2013 | Briggs et al. | |
| 10,301,964 B2 | 5/2019 | Spangler et al. | |
| 2010/0254824 A1* | 10/2010 | Naik | F01D 5/186 416/97 R |
| 2011/0070075 A1* | 3/2011 | Briggs | F01D 9/04 415/177 |
| 2014/0109577 A1 | 4/2014 | Lee et al. | |
| 2014/0290257 A1* | 10/2014 | Okita | F01D 5/189 60/752 |
| 2015/0003975 A1* | 1/2015 | Shchukin | F01D 5/18 415/178 |
| 2017/0298824 A1* | 10/2017 | Gerendas | F23R 3/002 |

FOREIGN PATENT DOCUMENTS

| | | |
|---|---|---|
| EP | 2 505 787 A1 | 10/2012 |
| EP | 2 778 369 A1 | 9/2014 |

OTHER PUBLICATIONS

International Preliminary Report on Patentability issued in connection with corresponding PCT Application No. PCT/US2015/057708 dated May 2, 2017.

Bunker, R. S., Angled Impingement Inserts With Cooling Features, GE Application No. 62/004718, filed on May 29, 2014.

Bunker, R. S., et al., Angled Impingement Insert For Particulate Accumulation Mitigation, GE Application No. 32/004723, filed on May 29, 2014.

Bunker, R. S., et al., Counterflow Impingement Cooling Assembly, GE Application No. 62/004709, filed on May 29, 2014.

Bunker, R. S., et al., Engine Component Assembly, GE Application No. 62/073449, filed on Oct. 31, 2014.

Bunker, R. S., et al., Engine Component Assembly, GE Application No. 62/073564, filed on Oct. 31, 2014.

Kulkarni, A. J., et al.. Angled Impingement With Channel Cooling Features, GE Application No. 62/004697, filed on May 29, 2014.

Preethi, P. H., et al., Angled Impingement Insert With Discrete Cooling Features, GE Application No. 62/004685, filed on May 29, 2014.

Stover, C. W., et al.. Shroud Assembly For A Turbine Engine, GE Application No. 62/073555, filed on Oct. 31, 2014.

\* cited by examiner

ENGINE COMPONENT ASSEMBLY

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, may be necessary. Typically, cooling is accomplished by ducting cooler air from the high and/or low pressure compressors to the engine components which require cooling. Temperatures in the high pressure turbine are around 1000° C. to 2000° C. and the cooling air from the compressor is around 500° C. to 700° C. While the compressor air is a high temperature, it is cooler relative to the turbine air, and may be used to cool the turbine.

Engine components have been cooled using different methods, including conventional convection cooling and impingement cooling. In conventional convection cooling, cooling fluid flows along a cooling path through the component, and heat is transferred into the flowing air. In impingement cooling, a cooling surface, typically an inner surface, of the component is impinged with high velocity air in order to transfer more heat by convection than with typical convection cooling.

Particles, such as dirt, dust, sand, and other environmental contaminants, in the cooling fluid can cause a loss of cooling and reduced operational time or "time-on-wing" for the aircraft environment. This problem is exacerbated in certain operating environments around the globe where turbine engines are exposed to significant amounts of airborne particles. In the most severe cases the entire cooling surface of the engine component becomes coated with particles, which reduces heat transfer and has the additional negative impact of film hole blockage.

BRIEF DESCRIPTION OF THE INVENTION

In one aspect, the invention relates to an engine component assembly having a first engine component having a hot surface in thermal communication with a hot combustion gas flow and a cooling surface, with the cooling surface being different than the hot surface, a second engine component having a first surface in fluid communication with a cooling fluid flow and a second surface, different from the first surface, spaced from the cooling surface and defining a space between the second surface and the cooling surface of the first engine component, at least one cooling aperture extending through the second engine component from the first surface to the second surface and defining a cooling fluid flow path along a cooling fluid streamline, and at least one cavity provided in the cooling surface and defining a cavity surface. The at least one cooling aperture is arranged such that the cooling fluid streamline extends at a non-orthogonal angle relative to the cooling surface proximate the at least one cavity.

DESCRIPTION OF EMBODIMENTS OF THE INVENTION

The described embodiments of the present invention are directed to cooling an engine component, particularly in a turbine engine. For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine centerline.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Figure 1:
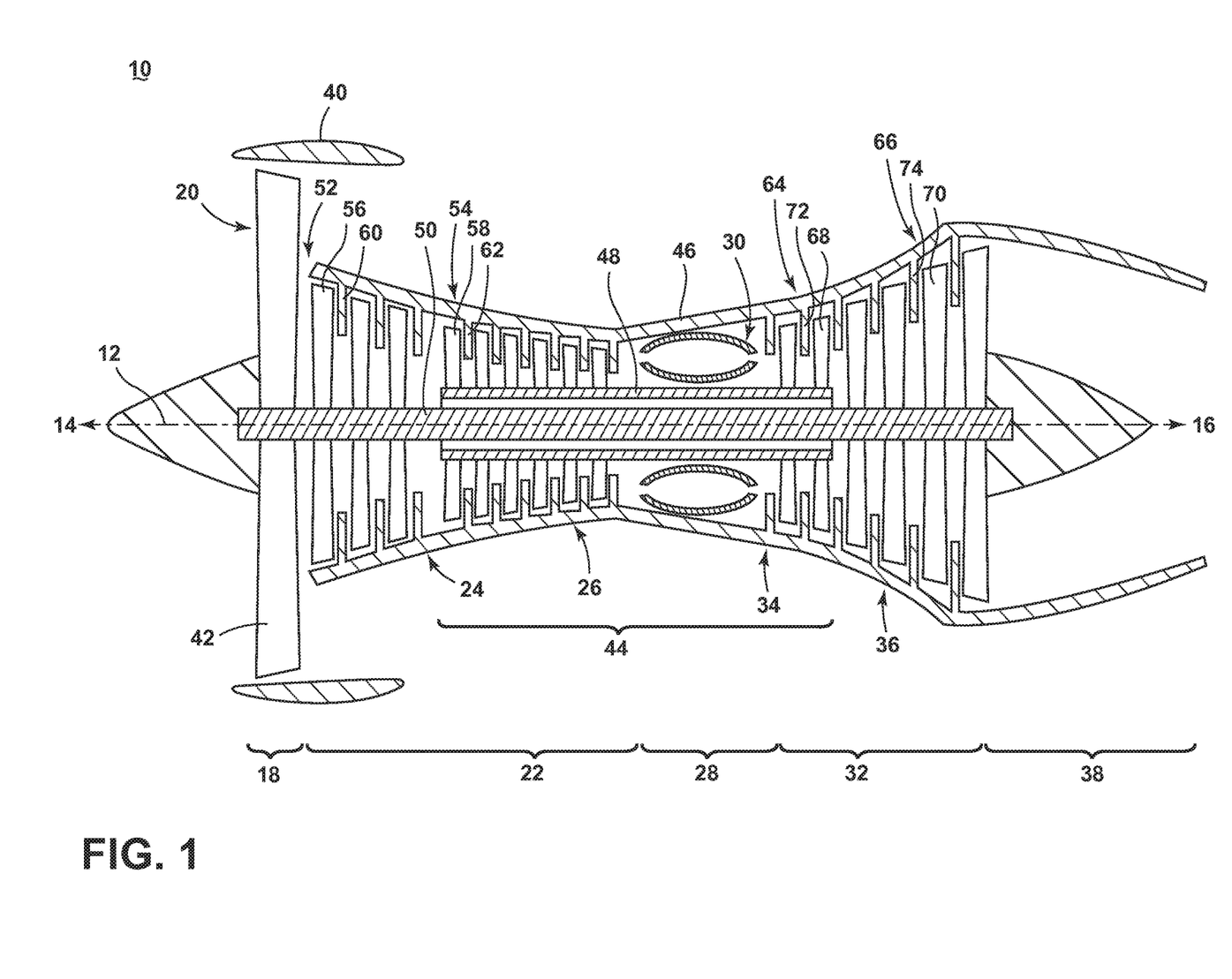
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 may bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid may be, but is not limited to, fluid discharged from the LP compressor 24 or the HP compressor 26.

Figure 2:
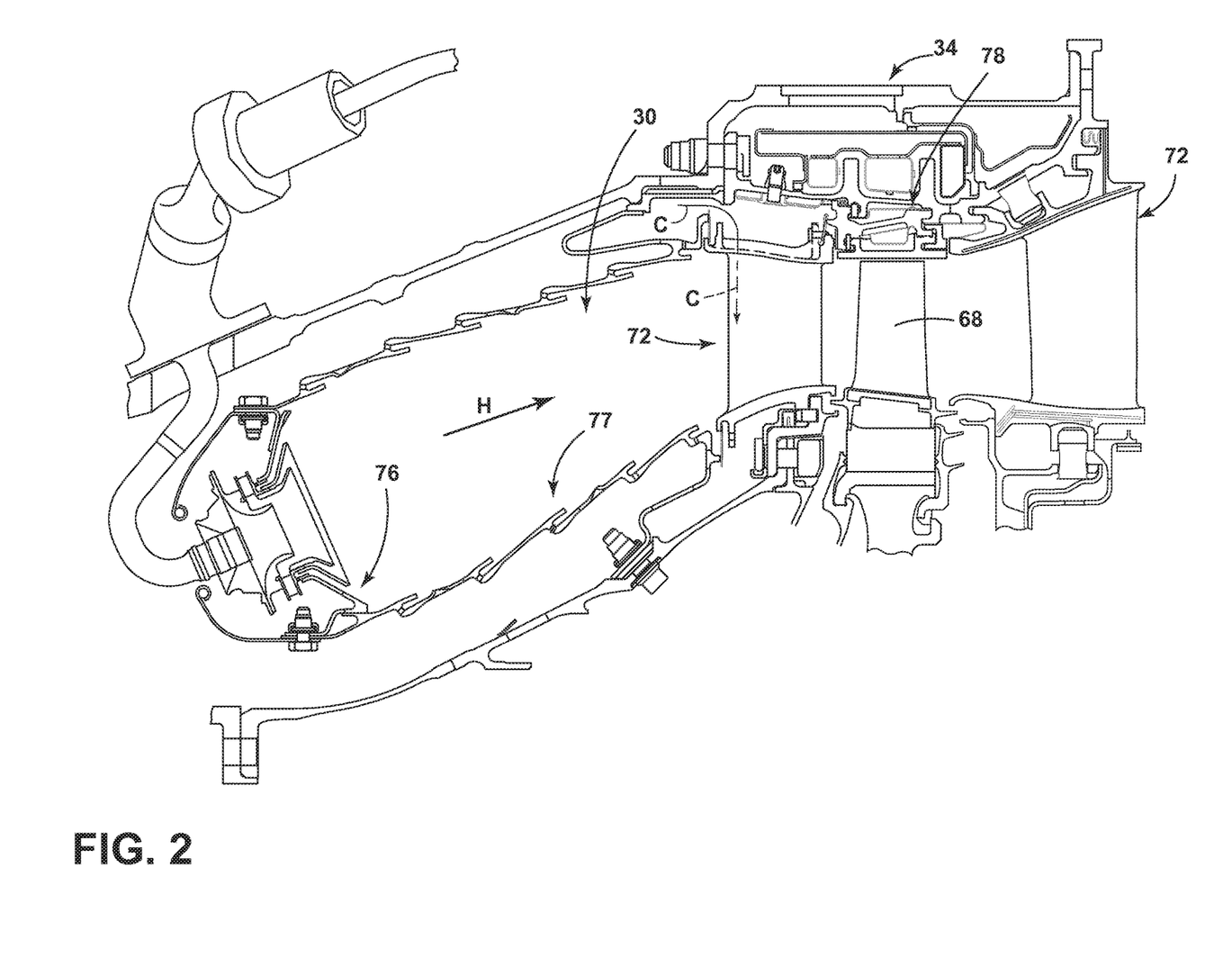
FIG. 2 is a side section view of a combustor and high pressure turbine of the engine from FIG. 1.

FIG. 2 is a side section view of the combustor 30 and HP turbine 34 of the engine 10 from FIG. 1. The combustor 30 includes a deflector 76 and a combustor liner 77. Adjacent to the turbine blade 68 of the turbine 34 in the axial direction are sets of static turbine vanes 72, with adjacent vanes 72 forming nozzles therebetween. The nozzles turn combustion gas so that the maximum energy may be extracted by the turbine 34. A cooling fluid flow C passes through the vanes 72 to cool the vanes 72 as hot combustion gas H passes along the exterior of the vanes 72. A shroud assembly 78 is adjacent to the rotating blade 68 to minimize flow loss in the turbine 34. Similar shroud assemblies can also be associated with the LP turbine 36, the LP compressor 24, or the HP compressor 26.

One or more of the engine components of the engine 10 has a surface in which various cooling embodiments disclosed further herein may be utilized. Some non-limiting examples of the engine component having a cooled surface can include the blades 68, 70, vanes or nozzles 72, 74, combustor deflector 76, combustor liner 77, or shroud assembly 78, described in FIGS. 1-2.

Figure 3:
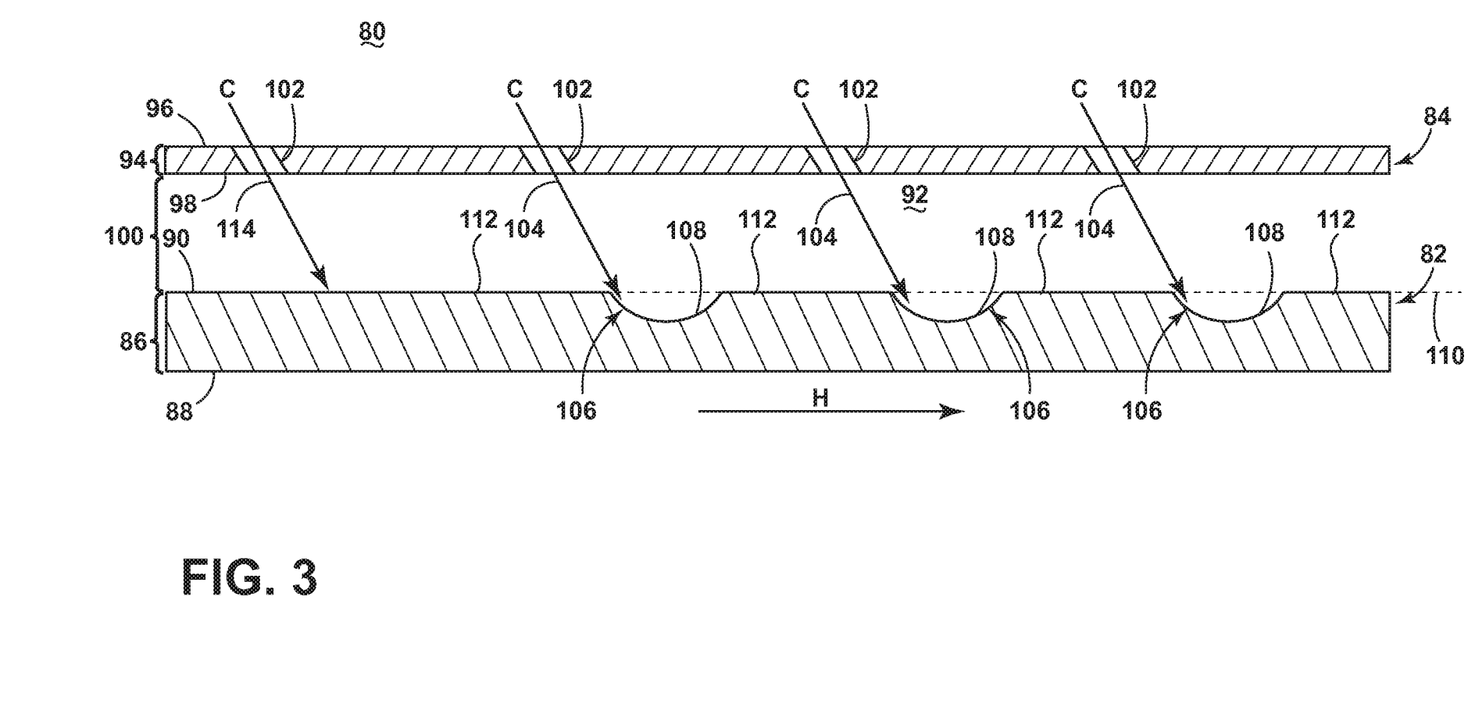
FIG. 3 is a schematic view showing an engine component assembly of the engine from FIG. 1 according to a first embodiment of the invention.

FIG. 3 is a schematic view showing an engine component assembly 80 of the engine 10 from FIG. 1 according to first embodiment of the invention. The engine component assembly 80 includes a first engine component 82 and a second engine component 84.

The first engine component 82 can be disposed in a flow of hot gases represented by arrows H. A cooling fluid flow, represented by arrows C may be supplied to cool the first engine component 82. As discussed above with respect to FIGS. 1-2, in the context of a turbine engine, the cooling air can be ambient air supplied by the fan 20 which bypasses the engine core 44, fluid discharged from the LP compressor 24, or fluid discharged from the HP compressor 26. Some non-limiting examples of the first engine component 82 include a blade, a nozzle, vane, shroud, combustor liner, or combustor deflector.

The first engine component 82 includes a substrate 86 having a hot surface 88 facing the hot combustion gas and a cooling surface 90 facing the cooling fluid. The first engine component 82 can define at least one interior cavity 92 comprising the cooling surface 90. The hot surface 88 may be an exterior surface of the engine component 82. In the case of a gas turbine engine, the hot surface 88 may be exposed to gases having temperatures in the range of 1000° C. to 2000° C. Suitable materials for the substrate 86 include, but are not limited to, steel, refractory metals such as titanium, or super alloys based on nickel, cobalt, or iron, and ceramic matrix composites.

The first engine component 82 can further include multiple film holes (not shown) that provide fluid communication between the interior cavity 92 and the hot surface 88 of the engine component 82. During operation, cooling air C is supplied to the interior cavity 92 and out of the film holes to create a thin layer or film of cool air on the hot surface 88, protecting it from the hot combustion gas H.

The second engine component 84 includes a substrate 94 having a first surface 96 in fluid communication with the cooling fluid flow C and a second surface 98 that is spaced from the cooling surface 90 and defines a space 100 between the second surface 98 and the cooling surface 90. Some non-limiting examples of the second engine component 94 include a wall, baffle, or insert within the blades 68, 70, vanes or nozzles 72, 74, combustor deflector 76, combustor liner 77, or shroud assembly 78, described in FIGS. 1-2. For example, second engine component 84 can comprise a baffle, with the substrate 94 comprising a wall of the baffle that is inserted within the interior cavity 92 of the first engine component 82, with the space 100 being formed from at least a portion of the interior cavity 92.

The second engine component 84 further includes one or more cooling aperture(s) 102 through which the cooling fluid flow C passes and is directed toward the cooling surface 90 of the first engine component 82. The cooling aperture 102 of the illustrated embodiment is provided at an impingement opening extending though the substrate 94 at a non-orthogonal angle with respect to the first and second surfaces 96, 98. The cooling aperture 102 can have various cross-sectional shapes and plan forms when viewed from the first and second surfaces 96, 98. In one example, the cooling aperture 102 can have a circular cross-sectional shape and an oval plan form when viewed from the first or second surface 96, 98.

The cooling aperture 102 can define a streamline 104 for the cooling fluid flow C. The streamline 104 may be collinear with the centerline of the cooling aperture 102, particularly in cases where the cooling aperture 102 is circular or otherwise symmetrical, as in the illustrated embodiment. In case where the cooling aperture 102 is irregular or asymmetrical, the streamline 104 may diverge from the centerline.

At least one cavity 106 can be provided in the cooling surface 90 of the first engine component 82. The cavity 106 increases the surface area of the cooling surface 90, allowing more heat to be removed from the first engine component 82, and also increases turbulence to minimize stagnation of the cooling air flow C. The cavity 106 can define a cavity surface 108 that is recessed below a two-dimensional imaginary surface 110 defined by a non-cavity portion 112 of the cooling surface 90. The imaginary surface 110 may lie in a plane or may be curved on the overall contour of the first engine component 82

Figure 4:
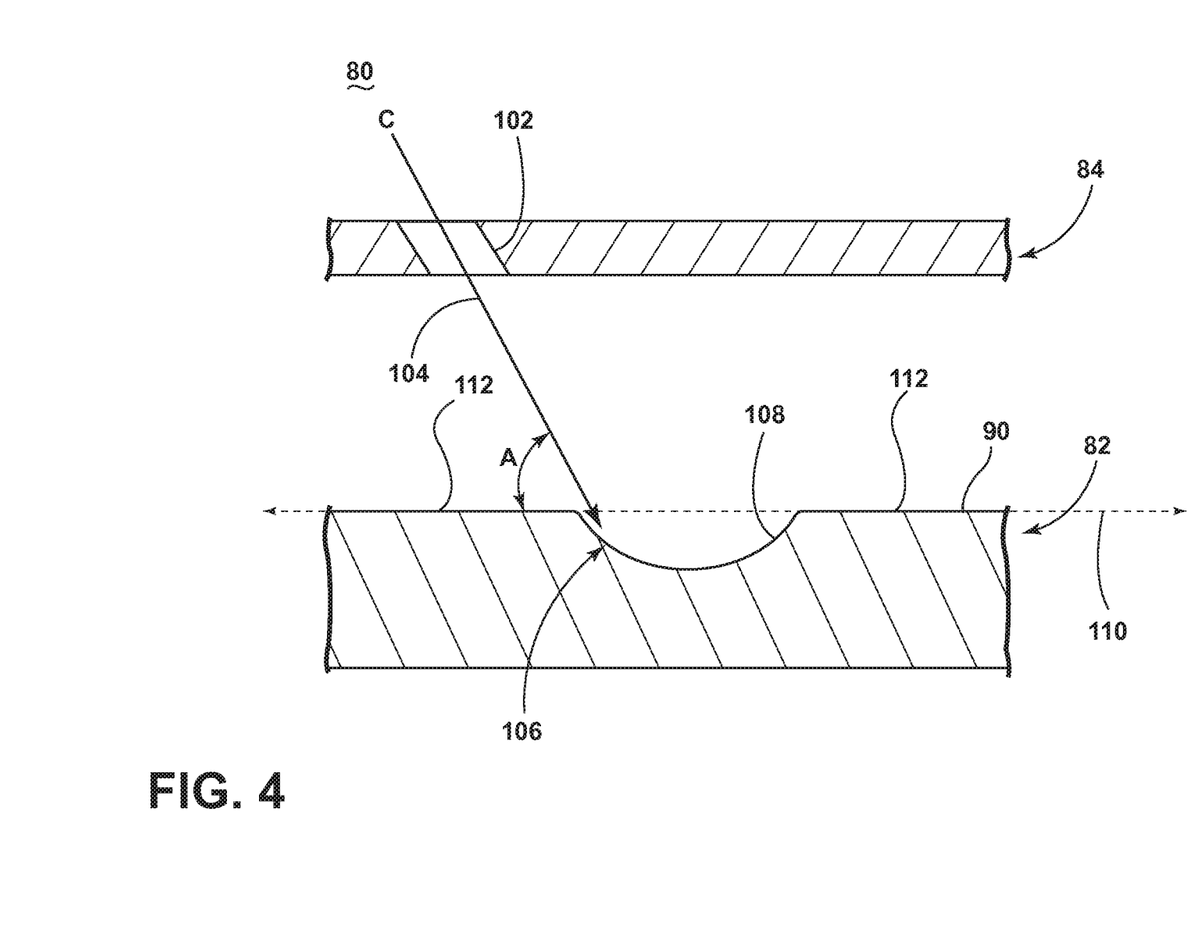
FIG. 4 is a close-up view showing a portion of FIG. 3.

With reference to FIG. 4, the cooling apertures 102 are arranged relative to the cooling surface 90 such that, the streamline 104 extends at a non-orthogonal streamline angle A relative to the imaginary surface 110 proximate the at least one cavity 106. The streamline 104 can preferably approach the cooling surface 90 at an orientation such that the streamline angle A is acute, as measured with respect to an upstream direction of the cooling fluid flow C. In one example, the streamline angle A can be 60 degrees or less.

Furthermore, the cavity 106 can be arranged relative to an associated cooling aperture 102 such that the streamline 104 contacts the cavity surface 108, rather than the non-cavity portion 112 of the cooling surface 90. An impingement angle is further defined as the angle at which the streamline 104 contacts the cavity surface 108, and is a function of the streamline angle A and the contour of the cavity surface 108. In some instances, the impingement angle is less than the streamline angle A, one benefit being that the shallow impingement angle lessens the direct ballistic impact of particles on the cooling surface 90, and hence lowers the probability of particles collecting on the cooling surface 90. In one example, the impingement angle can be near parallel with the cavity surface 108.

It is noted that while the streamline 104 of the cooling fluid flow C impinges on the cavity surface 108, at least some of the cooling fluid flow C may also impinge on the non-cavity portion 112 of the cooling surface 90 as well. For example, as shown in FIG. 3, the cooling fluid flow C may have another streamline 114 that contacts the non-cavity portion 112 of the cooling surface 90. The angle of impingement of the streamline 114 on the non-cavity portion 112 may be equal to the streamline angle A.

A plurality of cavities 106 can be provided on the cooling surface 90. A cooling aperture 102 can be provided for and dedicated to one cavity 106. The plurality of cavities 106 can be arranged in a predetermined configuration with respect to the cooling fluid flow C.

Figure 5:
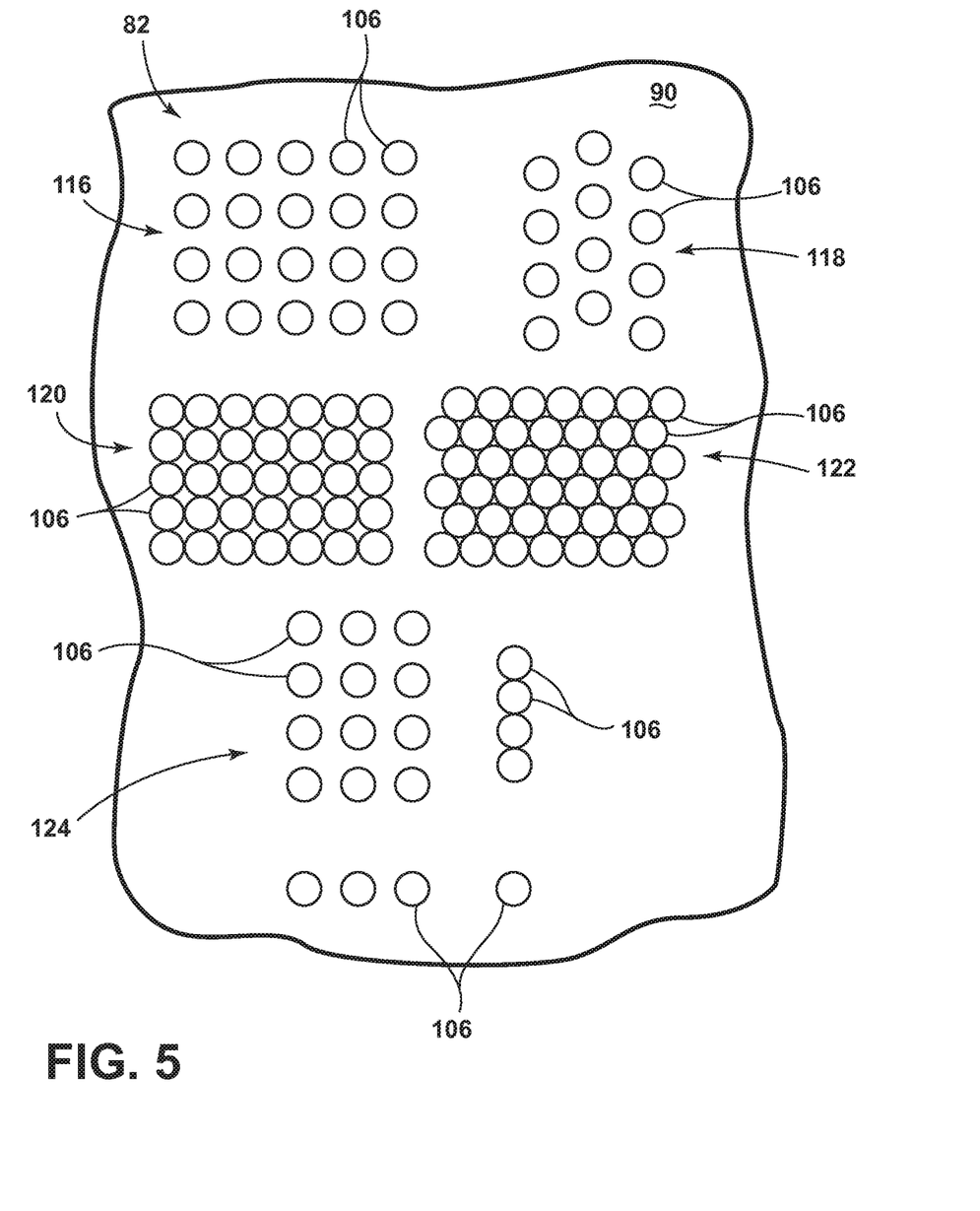
FIG. 5 is a plan view of some exemplary arrays of cooling features for the first engine component of the engine component assembly from FIG. 3.

FIG. 5 is a plan view of the cooling surface 90 of the first engine component 82 showing some examples of arrays of cavities 106 that can be provided on the cooling surface 90. The array may be arranged in accordance with some predetermined pattern, or may be irregular. For example: the array may be formed of rows of cavities 106 extending in first and second directions; the cavities 106 may be aligned or staggered; the cavities 106 may further be spaced from each other or contiguous; and/or the spacing between the cavities 106 may be constant or varied.

In the instant embodiment one array 116 is shown with uniform spacing between rows of aligned cavities 106. Another array 118 is shown with uniform spacing between rows of staggered cavities 106. Another array 120 is shown with aligned rows of contiguous cavities 106. Another array 122 is shown with staggered rows of contiguous cavities 106. Another array 124 is shown with varied spacing between rows of spaced and contiguous cavities 106.

A plurality of arrays may be utilized on the first engine component 82 or a mixture of arrays with uniform size and/or shape may be utilized. A single array may be formed or alternatively, a plurality of smaller arrays may be utilized along the cooling surface 90. The configuration of the array may be dependent upon locations where cooling is more desirable as opposed to utilizing a uniformly spaced array which provides generally equivalent cooling at all locations. For each of the exemplary arrays shown in FIG. 5, a corresponding array of cooling apertures 102 (see FIG. 3) can likewise be provided on the second engine component 84. The corresponding array can include a cooling aperture 102 dedicated to one cavity 106 or a cooling aperture 102 dedicated to multiple cavities 106.

Figure 6:
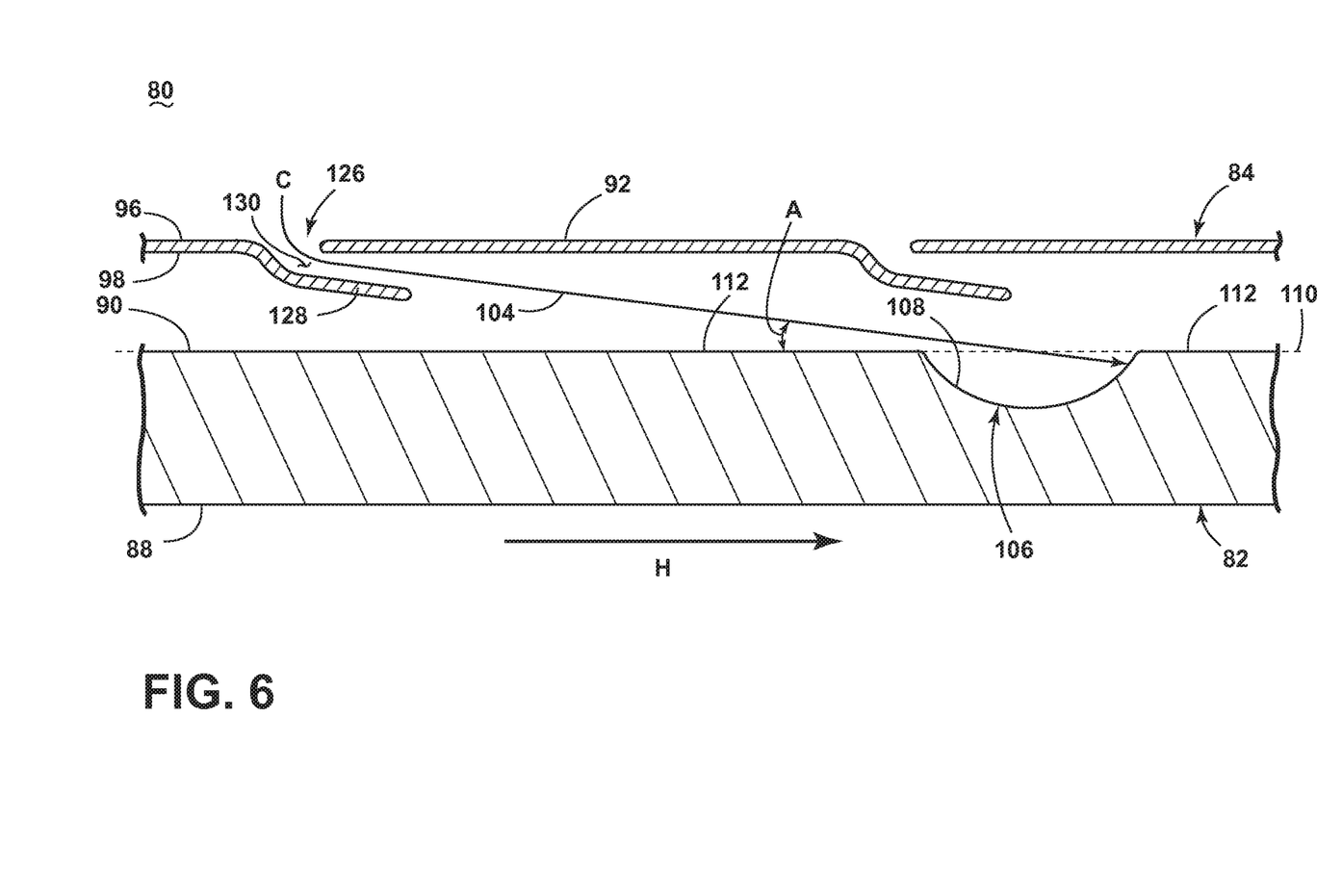
FIG. 6 is a schematic view showing an engine component assembly of the engine from FIG. 1 according to a second embodiment of the invention.

FIG. 6 is a schematic view showing an engine component assembly 80 according to second embodiment of the invention. The engine component assembly 80 is substantially similar to the first embodiment of the engine component assembly 80 shown in FIG. 3, and like elements are referred to with the same reference numerals. The second embodiment differs from the first in the configuration of the cooling apertures in the second engine component 84. Here, the illustrated cooling aperture 126 is formed by a louver 128 in the second engine component 84 which form an angled impingement opening 130 through the substrate 94. The louver 128 can be formed by spaced portions of the substrate 94 that at least partially overlap, as shown herein, or do not overlap. For FIG. 6, it is noted that while the streamlines 104 of the cooling fluid flow C are shown as impinging only on the cavities 106, at least some of the cooling fluid flow C may also impinge on a non-cavity portion of the cooling surface 90 as well.

Figure 7:
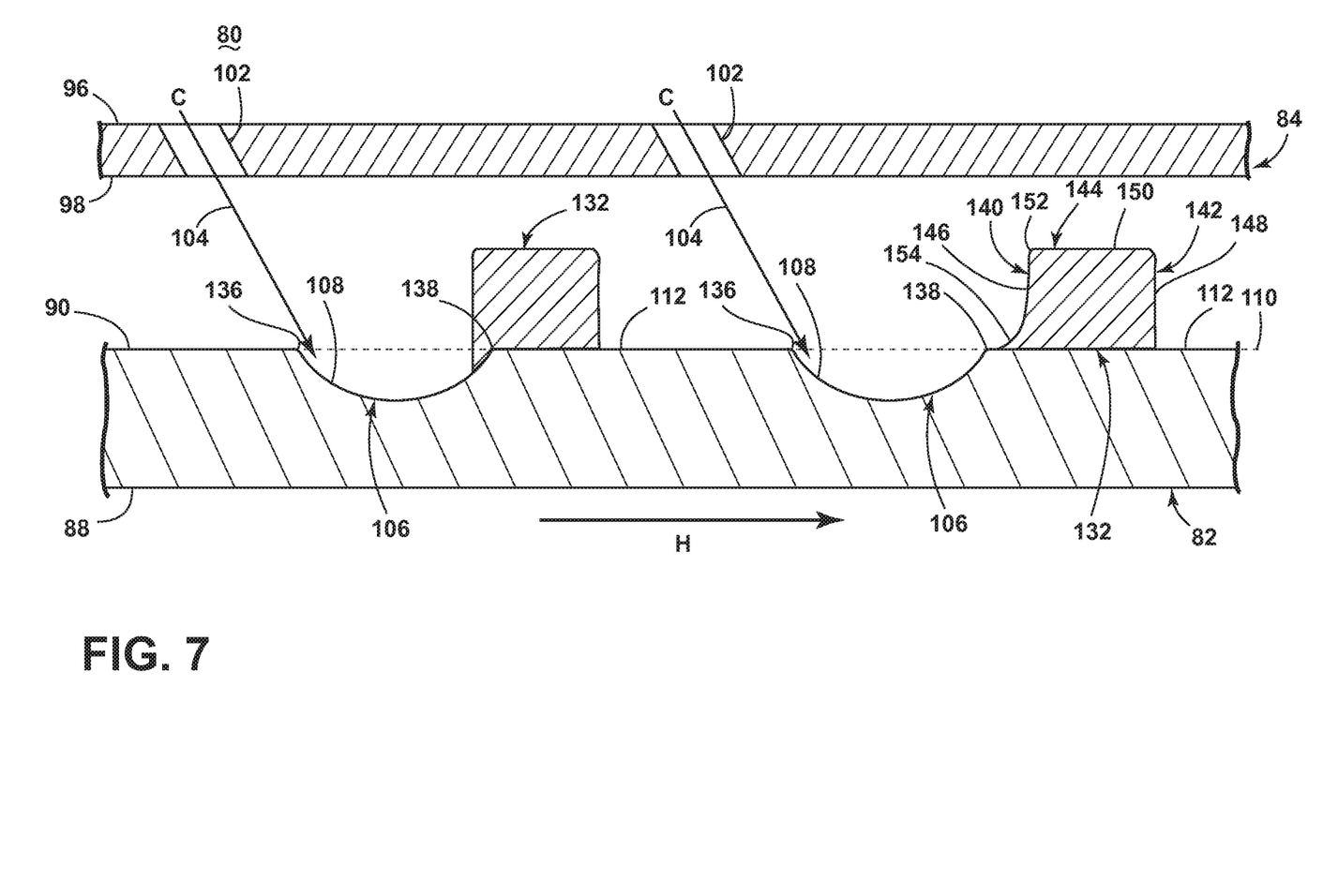
FIG. 7 is a schematic view showing an engine component assembly of the engine from FIG. 1 according to a third embodiment of the invention.
Figure 8:
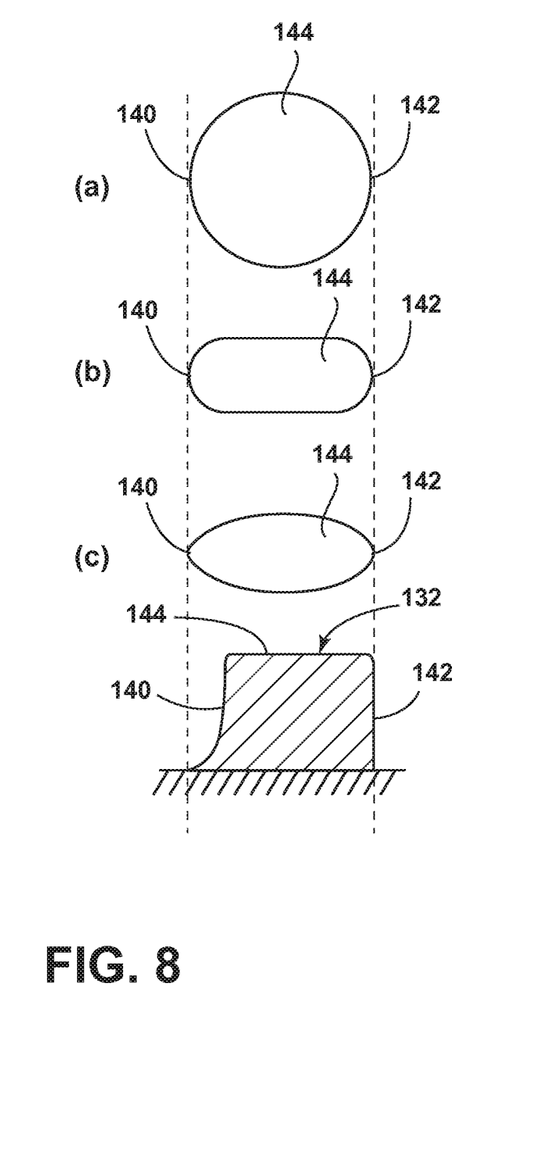
FIG. 8 is a schematic view showing various shapes for the cooling features provided for the engine component assembly from FIG. 7.

FIGS. 7-8 are schematic views showing an engine component assembly 80 according to further embodiments of the invention. In these further embodiments, the cooling surface 90 of the first engine component 82 is provided with at least one cooling feature extending above the two-dimensional imaginary surface 110 defined by the non-cavity portion 112 of the cooling surface 90. The cooling features increase the surface area of the cooling surface 90, allowing more heat to be removed from the first engine component 82. The cooling features also minimize stagnation points on the cooling surface 90. Various cooling features can be paired with the cavity. Some non-limiting examples of cooling features are a vortex generator, a turbulator, a pin fin, or an aerodynamic fin. One example of a suitable cooling feature in the form of fastback turbulators are more fully described in U.S. Pat. No. 8,408,872, issued Apr. 2, 2013, which is incorporated herein by reference in its entirety.

FIG. 7 is a schematic view showing an engine component assembly 80 according to third embodiment of the invention. The engine component assembly 80 is substantially similar to the first embodiment of the engine component assembly 80 shown in FIG. 3, and like elements are referred to with the same reference numerals. As shown in FIG. 7, cooling features can be provided as fins 132 paired with the cavities 106. The cavities 106 have a leading edge 136 and a trailing edge 138, relative to the cooling fluid flow C. The fins 132 can be provided proximate to or immediately at the trailing edge of the cavity. For example, on the aft cavity 106, the fin 132 is provided proximate to the trailing edge 138 of the cavity 106 and extends entirely from the non-cavity portion 112 of the cooling surface 90. On the forward cavity 106, the fin 132 is provided immediately at the trailing edge 138, and extends partially from the cavity surface 108.

The fin 132 has a leading edge 140 and a trailing edge 142, relative to the cooling fluid flow C, that are joined by a top edge 144. The leading and trailing edges 140, 142 can be defined, respectively, by a leading wall 146 and a trailing wall 148 that extend upwardly from the cooling surface 90, and the top edge 144 can be defined by a top wall 150 that extends between the leading and trailing walls 146, 150. The leading wall 146 and a trailing wall 148 may be curvilinear, arcuate or linear.

The leading edge 140 forms a first junction 152 with the top edge 144. The junction 152 can be a radiused structure, such as a convex edge. The leading edge 140 of the fin 132 further forms a second junction 154 with the cooling surface 90. The junction 154 can be a smooth transition between the cooling surface 90 and the fin 132, as shown, or can be defined by a sharp edge between the cooling surface 90 and the fin 132. A smooth transition may be preferable to avoid stagnation points on the cooling surface 90. The smooth transition can be an angled structure, such as an inclined ramp, or a radiused structure, such as a concave edge.

For FIG. 7, it is noted that while the streamlines 104 of the cooling fluid flow C are shown as impinging only on the cavities 106, at least some of the cooling fluid flow C may also impinge on a non-cavity portion of the cooling surface 90 as well, including on the fins 132.

The fin 132 of FIG. 7 can have various plan forms. Some non-limiting examples are shown in FIG. 8, and include: (a) round, in which the top wall 150 is circular and the leading and trailing edges 140, 142 are curved; (b) oval, in which the top wall 150 is egg-shaped or elliptical, and the leading and trailing edges 140, 142 are curved; (c) eye-shaped, in which the top wall 150 is tapered at the leading and trailing edges 140, 142; or combinations thereof.

Figure 9:
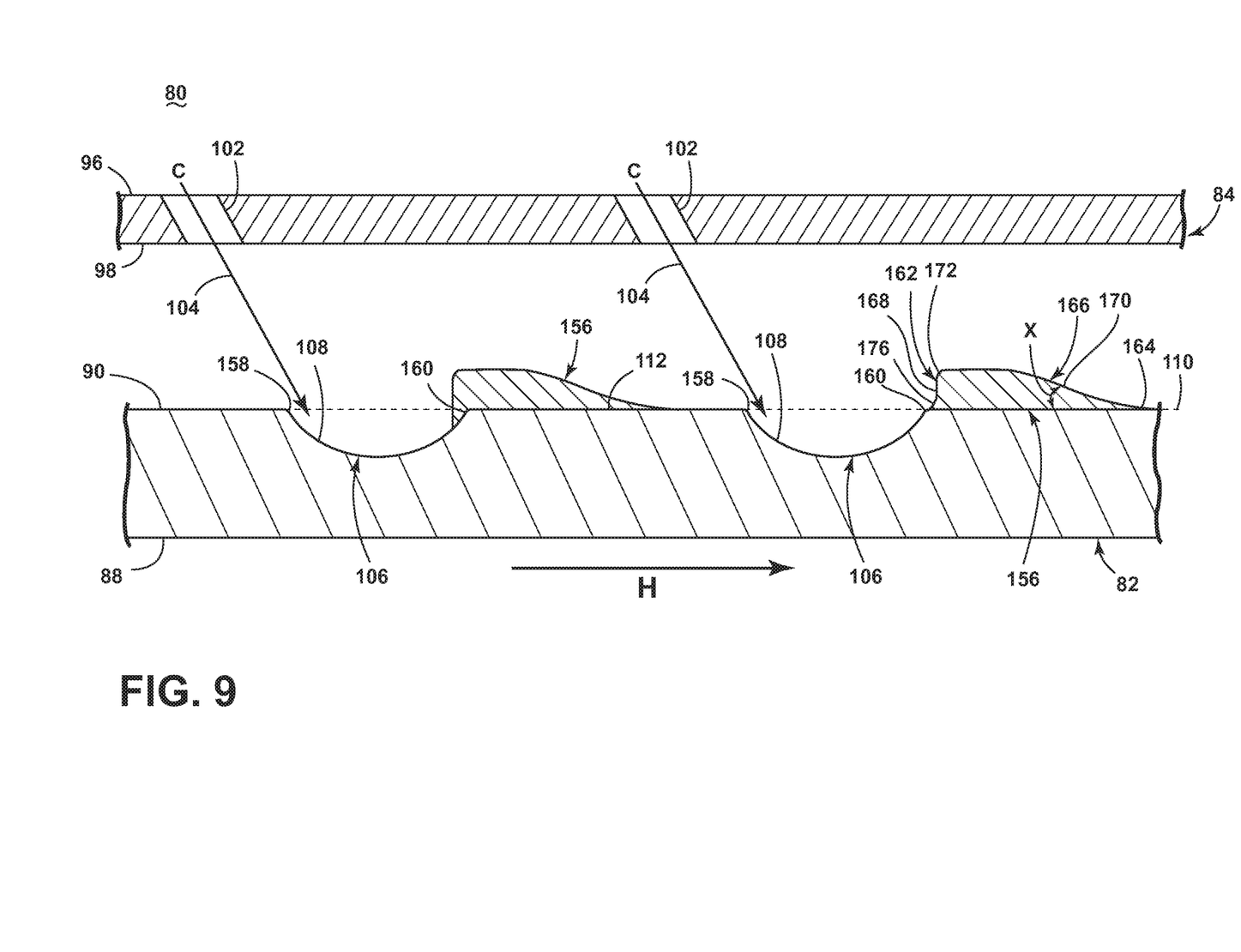
FIG. 9 is a schematic view showing an engine component assembly of the engine from FIG. 1 according to a fourth embodiment of the invention.

FIG. 9 is a schematic view showing an engine component assembly 80 according to a fourth embodiment of the invention. The engine component assembly 80 is substantially similar to the first embodiment of the engine component assembly 80 shown in FIG. 3, and like elements are referred to with the same reference numerals. As shown in FIG. 8, cooling features can be provided as turbulators 156 paired with the cavities 106. The cavities 106 have a leading edge 158 and a trailing edge 160, relative to the cooling fluid flow C. The turbulators 156 can be provided proximate to or immediately at the trailing edge of the cavity. For example, on the aft cavity 106, the turbulator 156 is provided proximate to the trailing edge 160 of the cavity 106 and extends entirely from the non-cavity portion 112 of the cooling surface 90. On the forward cavity 106, the turbulator 156 is provided immediately at the trailing edge 160, and extends partially from the cavity surface 108.

The turbulator 156 has a leading edge 162 and a trailing edge 164, relative to the cooling fluid flow C, that are joined by a top edge 166. The leading edge 162 can be defined by a leading wall 168 that extends upwardly from the cooling surface 90 and the top edge 166 can be defined by a top wall 170 that extends upwardly from the trailing edge 164 at an angle to converge with the leading wall 168 at a peak or ridge 172.

The top wall 170 can taper from the leading wall 168 in the general direction of the cooling fluid flow C, and can be longer than the height of the leading wall 168. In one example, the height H of the leading wall 168 can be between 0.5 and 5 mm. The top edge 166 forms an angle X with the cooling surface 90 having a vertex generally at the trailing edge 164. In one example, the angle X can be between 10 degrees and 40 degrees.

The leading edge 162 forms a junction 176 with the cooling surface 90. The junction 176 can be a smooth transition between the cooling surface 90 and the turbulator 156, as shown, or can be defined by a sharp edge between the cooling surface 90 and the turbulator 156. A smooth transition may be preferable to avoid stagnation points on the cooling surface 90. The smooth transition can be an angled structure, such as an inclined ramp, or a radiused structure, such as a concave edge. Likewise, the ridge 172 can be a radiused structure, such as a convex edge.

For FIG. 9, it is noted that while the streamlines 104 of the cooling fluid flow C are shown as impinging only on the cavities 106, at least some of the cooling fluid flow C may also impinge on a non-cavity portion of the cooling surface 90 as well, including on the turbulators 156.

Figure 10:
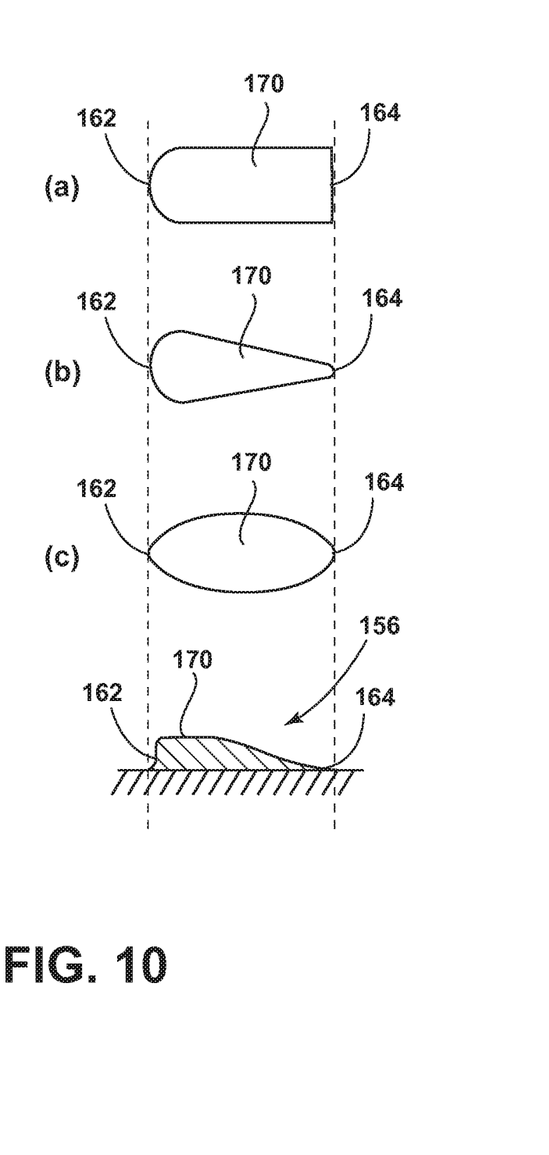
FIG. 10 is a schematic view showing various shapes for the cooling features provided for the engine component assembly from FIG. 9.

The turbulator 156 of FIG. 9 can have various plan forms. Some non-limiting examples are shown in FIG. 10, and include: (a) dome-shaped, in which the leading edge 162 is curved and the trailing edge is flat; (b) teardrop-shaped, in which the top wall 170 is curved at the leading edge 162 and tapered at the trailing edge 164; (c) eye-shaped, in which the top wall 170 is tapered at the leading and trailing edges 162, 164; or combinations thereof. One suitable turbulator is also more fully described in U.S. Pat. No. 8,408,872, issued Apr. 2, 2013, which is incorporated herein by reference in its entirety.

Figure 11:
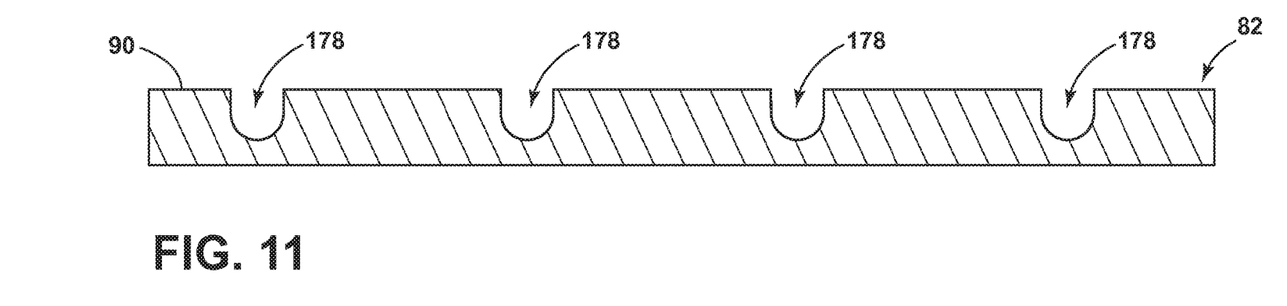
FIG. 11 is a schematic cross-sectional view showing a cooling surface of an engine component according to a fifth embodiment of the invention.
Figure 12:
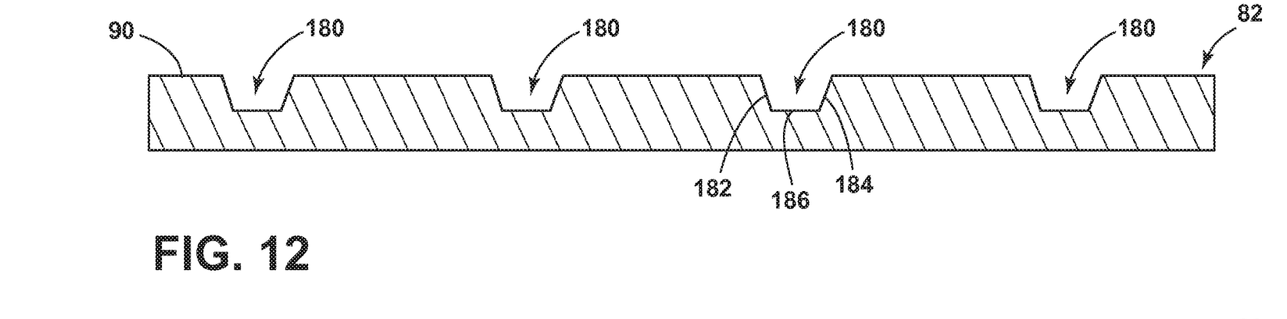
FIG. 12 is a schematic cross-sectional view showing a cooling surface of an engine component according to a sixth embodiment of the invention.
Figure 13:
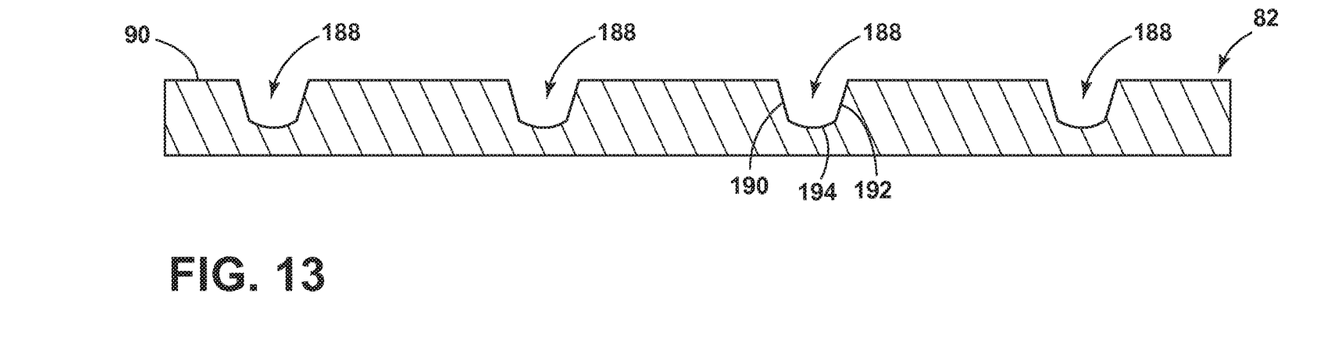
FIG. 13 is a schematic cross-sectional view showing a cooling surface of an engine component according to a seventh embodiment of the invention.

The cavities of any of the above embodiments can have a predetermined cross-sectional shape. For example, the cavities 106 shown in FIG. 3 are generally hemispherical, or include a partial segment of a hemisphere. FIGS. 11-13 show some other predetermined shapes for the cavities. In FIG. 11, the cooling surface 90 of the first engine component 82 is provided with cavities 178 having a generally hemiovoid or hemiellipsoid shape. In FIG. 12, the cooling surface 90 of the first engine component 82 is provided with multiple cavities 180 having a beveled shape, in which at least one side wall 182, 184 of the cavity 178 is set at an angle relative to a planar bottom wall 186. In FIG. 13, the cooling surface 90 of the first engine component 82 is provided with multiple cavities 188 also having a beveled shape, but at least one side wall 190, 192 of the cavity 188 is set at an angle relative to a curved bottom wall 194. Further, a single engine component 82 can be provided with cavities 106 having one or more of the cross-sectional shapes shown in FIGS. 3 and 11-13. Furthermore, a single cavity 106 can be provided with a combination of cross-sectional shapes. For example, one side wall can be beveled as shown in FIGS. 12-13 and the other side wall can be straight, as shown in FIG. 11.

Figure 14:
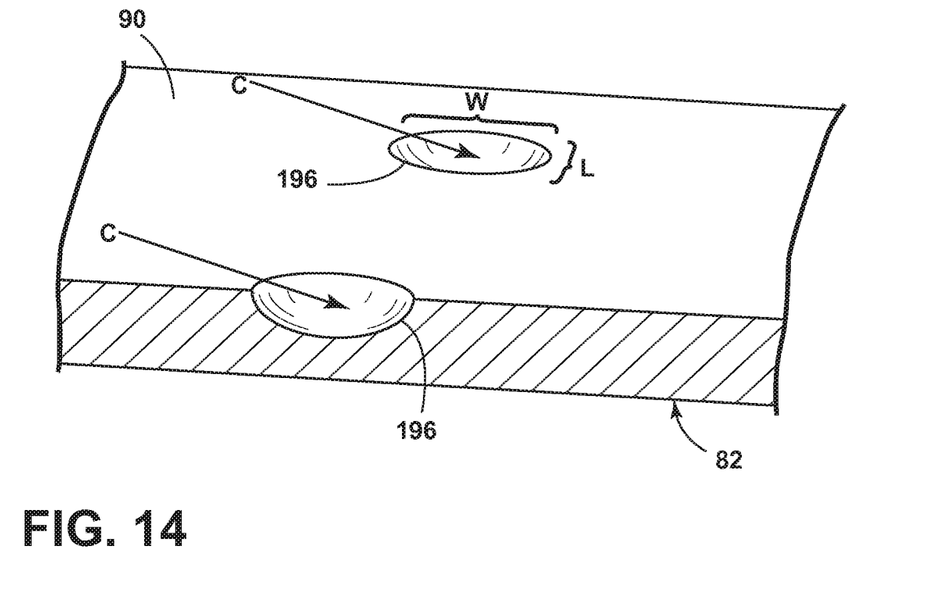
FIG. 14 is a schematic perspective view showing a cooling surface of an engine component according to an eighth embodiment of the invention.
Figure 15:
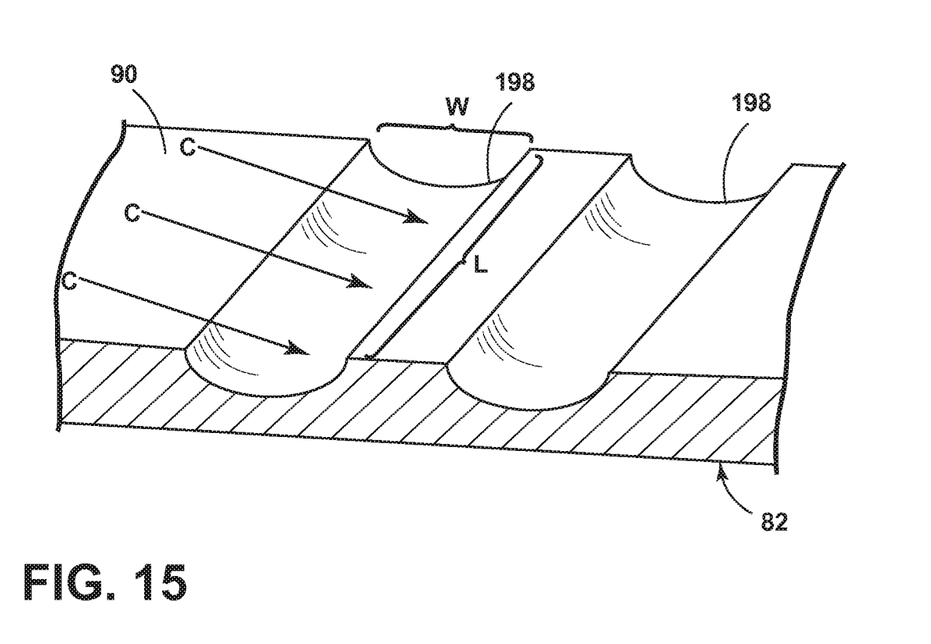
FIG. 15 is a schematic perspective view showing a cooling surface of an engine component according to a ninth embodiment of the invention.

The cavities of any of the above embodiments can further be provided in the form of a dimple or channel in the cooling surface 90 of the first engine component 82. For example, FIG. 14 shows a cooling surface 90 having a plurality of dimples 196 forming the cavities. Each dimple 196 is a discrete concavity having a length L and width W that are approximately the same. Each dimple 196 may be dedicated to one cooling aperture of the second engine component. FIG. 15 shows a cooling surface 90 having a plurality of channels 198 forming the cavities. Each channel 198 is a discrete concavity having a length L that is longer than its width W. Each channel 198 may be dedicated to one cooling aperture of the second engine component; alternatively, one channel 198 may be dedicated to multiple cooling apertures. For FIGS. 14-15, it is noted that while streamlines of the cooling fluid flow C are shown as impinging only on the cavities, at least some of the cooling fluid flow C may also impinge on a non-cavity portion of the cooling surface 90 as well.

In any of the above embodiments, it is understood that while the drawings may show the cavities having sharp corners, edges, and transitions for purposes of illustration, is may be more practical for the corners, edges, and transitions to be smoothly radiused or filleted to avoid the formation of stagnation points. Furthermore, in any of the above embodiments, a protective coating, such as a thermal barrier coating, can be applied to the hot surface 88 of the first engine component 82. Also, the present invention may be combined with shaping or contouring of film holes in the first engine component 82.

The various embodiments of systems, methods, and other devices related to the invention disclosed herein provide improved cooling for turbine engine components. One advantage that may be realized in the practice of some embodiments of the described systems is that dust accumulation on cooled engine components can be reduced or eliminated. Certain engine components are reliant on cooling to maintain an acceptable metal temperature and meet life requirements. The current designs that rely on impingement cooling typically direct a high-velocity air jet at an angle normal (90 degrees) to the cooling surface in combination with cast-in raised features on the cooling surface, such as bumps. However, the 90 degree impingement creates a stagnation location at the strike point of the air jet on the cooling surface. This stagnation region collects particles, which acts as an insulator on the component. Raised features on the cooling surface may increase the amount of dust that accumulates on the component, further reducing the ability for the component to be cooled by impingement.

The present invention overcomes these deficiencies by using low or near parallel angle impingement in combination with a contoured cooling surface which reduces or eliminates dust accumulation while maintaining component cooling effectiveness. This effectiveness can increase the time-on-wing (TOW) for the turbine engine and the service life of these parts can be increased.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An engine component assembly, comprising:
    a first engine component having a hot surface in thermal communication with a hot combustion gas flow and a cooling surface, with the cooling surface being different than the hot surface;
    a second engine component having a first surface in fluid communication with a cooling fluid flow and a second surface, different from the first surface, parallel to and spaced from the cooling surface and defining a space between the second surface and the cooling surface of the first engine component;
    at least one cooling aperture extending through the second engine component from the first surface to the second surface and defining a cooling fluid flow path along a cooling fluid streamline; and
    at least one cavity provided in the cooling surface and defining a cavity surface;
    wherein the at least one cooling aperture is arranged such that the cooling fluid streamline extends at a non-orthogonal angle relative to the cooling surface and towards the at least one cavity.

2. The engine component assembly of claim 1 wherein the at least one cooling aperture and the at least one cavity are arranged such that the cooling fluid streamline contacts the cavity surface.

3. The engine component assembly of claim 2 wherein the cooling fluid streamline contacts the cavity surface at an acute impingement angle.

4. The engine component assembly of claim 1 wherein the non-orthogonal angle is an acute angle.

5. The engine component assembly of claim 4 wherein the acute angle is less than 60 degrees.

6. The engine component assembly of claim 1 wherein the cooling fluid streamline is non-orthogonal to a non-cavity portion of the cavity surface.

7. The engine component assembly of claim 1 wherein the at least one cavity comprises a plurality of cavities.

8. The engine component assembly of claim 7 wherein the plurality of cavities is arranged in a predetermined configuration.

9. The engine component assembly of claim 7 wherein the at least one cooling aperture comprises at least one cooling aperture for each of the plurality of cavities.

10. The engine component assembly of claim 1 wherein the at least one cavity comprises a dimple or a channel.

11. The engine component assembly of claim 1 wherein the at least one cavity has a leading edge and a trailing edge relative to the cooling fluid flow path.

12. The engine component assembly of claim 11 further comprising a cooling feature provided at or by the trailing edge.

13. The engine component assembly of claim 12 wherein the cooling feature is provided at the trailing edge.

14. The engine component assembly of claim 12 wherein the cooling feature comprises at least one of a vortex generator, a turbulator, a pin fin, or an aerodynamic fin.

15. The engine component assembly of claim 12 wherein the cooling feature has a leading edge and a trailing edge relative to the cooling fluid flow path, and the cooling feature leading edge forms a transition with the at least one cavity.

16. The engine component assembly of claim 15 wherein the transition is a smooth transition.

17. The engine component assembly of claim 16 wherein the smooth transition comprises a radiused structure.

18. The engine component assembly of claim 17 wherein the cooling feature leading edge has an upward extent that terminates in a radiused structure.

19. The engine component assembly of claim 18 wherein the cooling feature comprises a top edge extending between the cooling feature leading edge and the cooling feature trailing edge, and the top edge reduces in height from the cooling feature leading edge to the cooling feature trailing edge.

20. The engine component assembly of claim 19 wherein the top edge tapers from the cooling feature leading edge to the cooling feature trailing edge when viewed in a plane transverse to the direction of the cooling fluid flow path.

21. The engine component assembly of claim 20 wherein the top edge forms an angle with the cooling surface of the first engine component having a vertex at the cooling feature trailing edge and the angle is between 10 degrees and 20 degrees.

22. The engine component assembly of claim 1, wherein the at least one cooling aperture is defined by a louver in the second engine component.

23. The engine component assembly of claim 1 wherein the first engine component comprises at least one of a nozzle, a vane, a blade, a shroud, a combustor liner, or a combustor deflector.

24. The engine component assembly of claim 1 wherein the second engine component comprises a wall located within an interior of the first engine component.

25. The engine component assembly of claim 24 wherein the space is formed from at least a portion of the interior of the first engine component.

26. The engine component assembly of claim 24 wherein the wall comprises an insert located within the interior of the first engine component and the at least one cooling aperture extends through the insert.

* * * * *

UNITED STATES PATENT AND TRADEMARK OFFICE
CERTIFICATE OF CORRECTION

PATENT NO. : 11,280,215 B2
APPLICATION NO. : 15/522854
DATED : March 22, 2022
INVENTOR(S) : Bergholz et al.

Page 1 of 1

It is certified that error appears in the above-identified patent and that said Letters Patent is hereby corrected as shown below:

On the Title Page

Page 2, Other Publications "(Bunker, R. S., et al., Angled Impingement Insert For Particulate Accumulation Mitigation, GE Application No. 32/004723, filed on May 29, 2014.)" should be --"(Bunker, R. S., et al., Angled Impingement Insert For Particulate Accumulation Mitigation, GE Application No. 62/004723, filed on May 29, 2014.--

Signed and Sealed this
Nineteenth Day of July, 2022

Katherine Kelly Vidal
*Director of the United States Patent and Trademark Office*